United States Patent
Anthony et al.

[11] 3,894,363
[45] July 15, 1975

[54] METHOD OF HONING GEARS

[75] Inventors: Russell W. Anthony, Fairhaven; Carl H. Motz, Gaylord; Richard W. Tersch, Grosse Pointe, all of Mich.

[73] Assignee: Lear Siegler, Inc., Santa Monica, Calif.

[22] Filed: Apr. 29, 1974

[21] Appl. No.: 465,093

Related U.S. Application Data

[60] Continuation-in-part of Ser. No. 381,791, July 23, 1973, abandoned, which is a division of Ser. No. 159,734, July 16, 1971, Pat. No. 3,765,129.

[52] U.S. Cl. .......................... 51/287; 51/5 D; 51/26
[51] Int. Cl. .............................................. B24b 1/00
[58] Field of Search .................. 51/5 D, 26, 52, 287

[56] References Cited
UNITED STATES PATENTS

| | | | |
|---|---|---|---|
| 1,252,478 | 1/1918 | Noyes | 51/52 R |
| 1,305,878 | 6/1919 | Carpmael | 51/165.77 |
| 1,579,713 | 4/1926 | Knowles | 51/165.88 |
| 2,443,410 | 6/1948 | Wickman | 51/52 R |
| 2,776,529 | 1/1957 | Osplack | 51/287 |
| 2,885,830 | 5/1959 | Watt | 51/26 |
| 3,054,225 | 9/1962 | Praeg | 51/26 X |
| 3,393,478 | 7/1968 | Fabish et al. | 51/287 |
| 3,590,534 | 7/1971 | Snyder | 51/165.88 |

*Primary Examiner*—Harold D. Whitehead
*Attorney, Agent, or Firm*—Whittemore, Hulbert & Belknap

[57] ABSTRACT

The method of honing gears which comprises placing the first gear of a first series of gears in tight mesh with a gearlike hone in new condition so as to have a predetermined clearance between the crests of the hone teeth anf the bottom of the spaces between gear teeth, and thus establishing an initial position to be occupied by the first gears of successive series of gears, rotating the gear and hone in tight mesh under light pressure contact to finish the side profiles of the teeth of the gear while material is worn away from the sides of the hone teeth while maintaining the hone in a fixed position. Repeating the process with successive gears in the first series while reducing the center distance between the hone and successive gears to maintain tight mesh as material is removed from the sides of the hone teeth until the crests of the hone teeth approach an interference condition in which they would bottom in the spaces between gear teeth. At this time the honing operation on the first series of gear teeth is terminated and the hone is either replaced with a new hone or is reconditioned by removing material from the crests of the teeth. In either case, substantially the same clearance is introduced between the crests of the hone teeth and the bottom of the spaces between gear teeth of the first gear of the second series. Thereafter, the cycle is repeated on the multiplicity of gears constituting the second series until sufficient material is worn away from the sides of the hone teeth to cause approach to the aforesaid interference condition.

5 Claims, 5 Drawing Figures

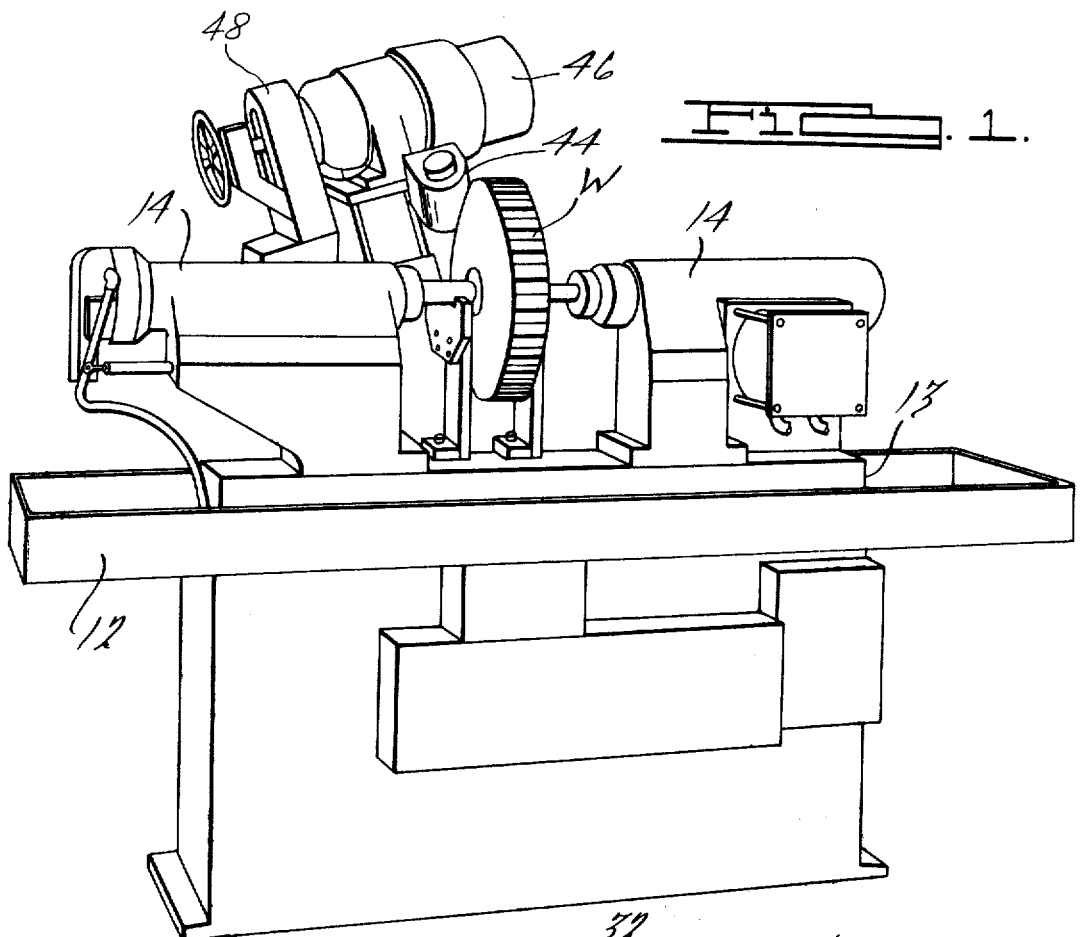
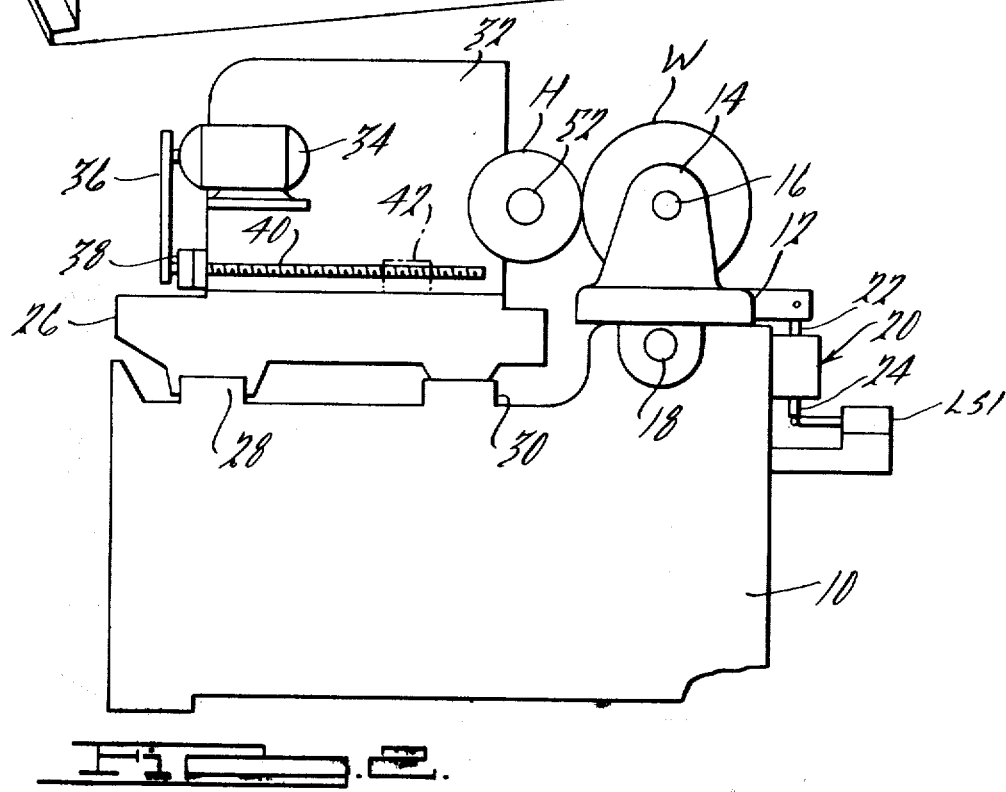

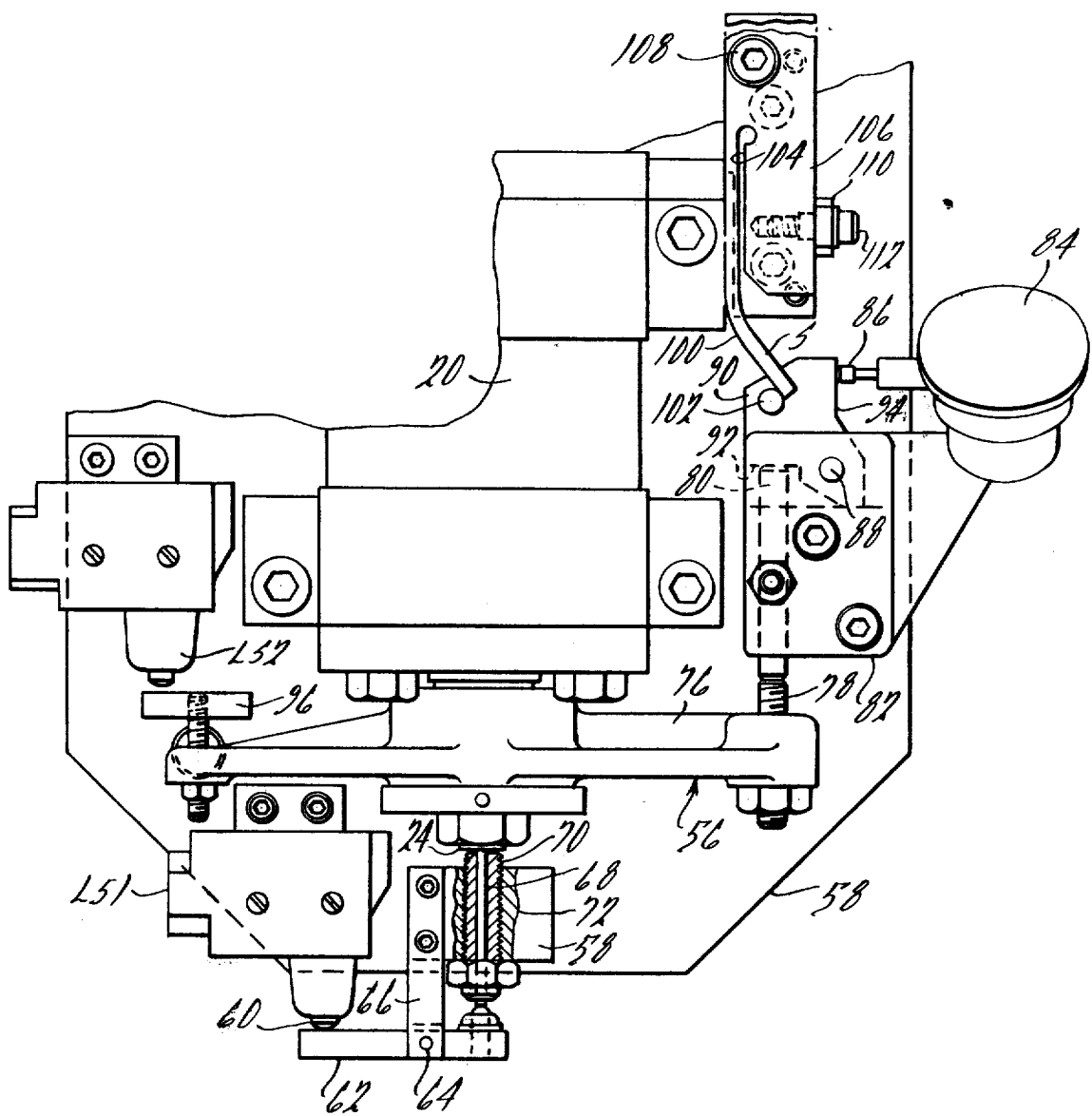

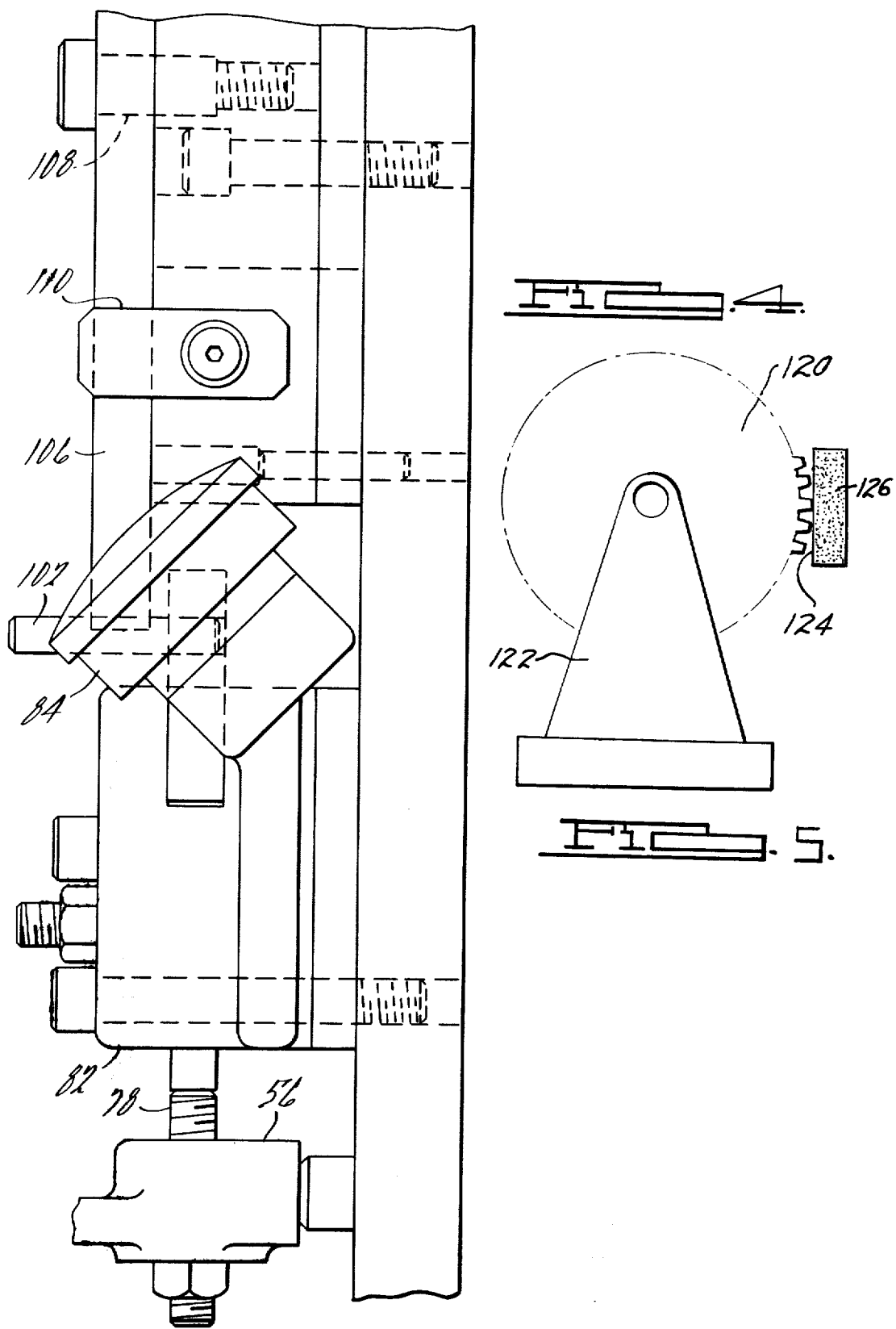

METHOD OF HONING GEARS

CROSS REFERENCE TO RELATED APPLICATIONS

The present application is a continuation-in-part of prior copending application Ser. No. 381,791, filed 7-23-1973 and now abandoned, which is a division of application Ser. No. 159,734, filed 7-16-1971 and now U.S. Pat. No. 3,765,129 issued 10-16-1973.

BRIEF SUMMARY OF THE INVENTION

The present invention is intended primarily for use in conjunction with a gear honing machine but certain aspects may be used in gear shaving or rolling. In honing gears, the tool is in the form of a gear conjugate to the work gear and having teeth portions formed of a suitable yieldable resin containing abrasive particles. The honing operation is generally applied to hardened gears and is effective to remove nicks and burrs as well as to improve the finish generally.

Since the operation is essentially abrading, the teeth of the hone undergo constant wear. The operation is carried out with the hone and gear in tight mesh and under carefully controlled pressure conditions. Accordingly, as the teeth of the hone wear, the minimum center distance between the hone and successive gears diminishes until eventually it becomes necessary to dress the hone to reduce the outside diameter of the hone, or in other words, to reduce the tooth height thereof.

The resultant radial force acting directly between the engaged portions of the gear and hone is determined by the difference between the force applied to the movable hone or gear support, and that part of the motive force necessary to initiate movement thereof. This resultant force is relatively small compared to the forces which may be required to move relatively heavy machine components in the gear finishing operation. In order to obtain a measurement of the actual resultant force acting directly between the engaged portions of the gear and hone irrespective of the magnitude of the force which may be applied to the relatively heavy machine components, means are provided for obtaining a direct measurement of the resultant force available for determining the actual pressure contact conditions between the teeth of the gear and hone. By observing the magnitude of the total motive force applied at this time, and maintaining this total motive force constant during the gear honing operation, the much smaller resultant force between the gear and hone may be maintained at accurately controlled values. Account is of course taken of mechanical advantages, if any, due for example to lever arms which may determine the actual force acting between the hone and gear.

In the present case a measuring device, conveniently in the form of a dial indicator, is provided for the purpose of determining wear as it takes place progressively on the hone. When a new hone is placed on the machine, the dial indicator is zeroed when the hone and gear are initially brought into tight mesh. Thereafter, the operator observes the action of the honing tool and gear, and when the hone has worn sufficiently so that the crests of the hone teeth are bottomed in the spaces between the teeth of the work gear, the amount of reduction in center distance between the gear and hone is noted by observing the dial indicator reading at this time. This is taken to be the amount of center distance reduction at which further hone dressing operations are required. Thereafter, signaling means on the machine are set so that when this predetermined reduction in center distance is approached, a signal light goes on which indicates to the operator that the hone requires dressing or replacement. Thus, after the first usage of the hone, it is thereafter unnecessary for the operator to observe the hone operation carefully so as to determine when the hone requires further dressing, since the signal will inform him when this is necessary.

According to another feature of the present invention, the dial indicator is employed in conjunction with a relatively stiff spring opposing movement of the movable hone or work support. The spring is calibrated so that a known spring deflection, which may be measured on the indicator, accurately represents the surplusage of force over that required to move the work or tool support and thus, available to establish the operating pressure conditions between the hone and gear.

Finally, according to another feature of the present invention, means are provided for re-establishing initial honing conditions whenever the hone has been dressed or replaced after undergoing a predetermined amount of wear. According to this feature of the invention the gear support occupies an initial or starting position when a gear thereon is in tight mesh with a honing tool in new or newly dressed condition. In the specific embodiment of the invention, where the work gear is supported on a tilt table biased by fluid pressure to rock the table so as to provide a yielding force maintaining the gear in tight mesh with the hone, the starting position is preferably the position in which the table extends horizontally and the axis of the gear is located directly above the axis of the pivot mounting of the table. Alternatively of course, the starting position may be such that the axis occupied by successive gears moves from a position displaced slightly at one side of a vertical plane through the pivot axis of the table to a finishing position located a substantially equal distance at the opposite side of such plane. When the hone has undergone sufficient wear so that the crests of the teeth of the hone begin to bottom in the spaces between the teeth of the gear, an interference condition is approached and at this time the honing operation is suspended while the hone is either dressed by removing material from its outside diameter, or if it is sufficiently worn, the hone may be replaced. Thereafter, the hone support is advanced to bring the hone into engagement with a work gear and to move the work gear rearwardly so as to cause the work support, and specifically in the present case, the tilt table, to again assume the initial or starting position. The operation is preferably carried out automatically by a motor which advances the hone support to cause engagement between the hone and work gear and thereafter to move the work gear to rock the tilt table to starting position. A limit switch actuated by the work support when it is moved into its starting position is actuated to terminate operation of the motor.

BRIEF DESCRIPTION OF THE DRAWINGS

FIG. 1 is a simplified perspective view of a gear honing machine to which the present invention is applied.

FIG. 2 is a simplified diagrammatic view illustrating the relationship between machine components.

FIG. 3 is an enlarged fragmentary elevational view of the wear and pressure measuring structure.

FIG. 4 is a side elevational view of the structure shown in FIG. 3.

FIG. 5 is a diagrammatic view illustrating the step of dressing the hone.

DETAILED DESCRIPTION

Referring first to FIGS. 1 and 2 the gear honing machine comprises a frame 10 at the front of which there is mountee a tilt table 12 having head and tail stocks 14 for supporting a work piece W. The stocks 14 provide spindle means indicated at 16 mounting the work gear W for rotation on a horizontal axis. The tilt table 12 is pivoted to the frame 10 by pivot means 18, the axis of which is mounted substantially beneath the axis of the work spindle means 16.

Carried by the frame 10 is a fluid pressure piston and cylinder device 20 having a piston therein and a piston rod connected thereto, the upper portion of the piston rod being indicated at 22 and being connected to the forwardly extending end of the tilt table 12 as best illustrated in FIG. 2. The lower end of the piston rod indicated at 24, extends below the cylinder and performs a number of actions which will subsequently be described. In FIG. 2 however, the downwardly extending portion 24 of the piston rod is shown diagrammatically as actuating a limit switch LS1.

Located on the frame 10 in rear of the work supporting tilt table 12 is a sub-slide 26 guidedly supported on ways 28 and additionally supported on a slideway 30. The movement thus provided for the sub-slide 26 is horizontal and parallel to the axes of the pivot support 18 and the axis of the work spindle means 16. Suitable means are provided for effecting back and forth traverse of the sub-slide 26 so as to distribute honing action longitudinally of the work gear W from one side to the other, or from end to end of the teeth teeth thereof.

Mounted on the sub-slide 26 for horizontal movement to the right and left as seen in FIG. 2 is a hone slide 32. Power means including a motor 34 connected by a belt 36 and gear reduction means 38 to an adjusting screw 40 is provided. The screw 40 is engaged in a nut 42 carried by the sub-slide 26 and it will be observed that operation of the motor will effect adjusting movement of the hone slide 32 toward or away from the work support.

Carried at the front of the hone slide 32 is a hone support 44 which is mounted for adjustment thereon about a horizontal axis perpendicular to and intersecting the axes of the hone H and the work gear W. In FIG. 2 the hone support is shown with its axis extending horizontally for simplicity, but in FIG. 1 it will be apparent that the hone support has been angularly adjusted since the hone drive motor 46 is shown as extending at an angle to the horizontal. Drive means interconnect the motor 46 and the hone H may take the form of a belt concealed by cover 48. Means for angularly adjusting the hone support include circular guide means including a pilot (not shown), and the hone support will be clamped in adjusted position on the forward end of the hone slide.

With the structure as so far described, one of the important features of the present invention may now be described.

When an initial setup is made a hone in new condition or newly redressed is mounted on the hone spindle means 52 and the first of a succession of work gears W is mounted on the work spindle means 16. At this time it may be assumed that the hone slide 32 is retracted to the left as seen in FIG. 2, at which position the hone may be dressed or a new hone mounted on the hone spindle means 52 if required. The motor 34 is now energized to operate the screw 40 to advance the slide 32 to the right as seen in FIG. 2. The hone will of course engage in meshed relation with the work gear W. It may be assumed that pressure in the cylinder 20 biases the tilt table 12 in a counterclockwise direction. Power advance of the slide 32 will cause the tilt table 12 to rock in a clockwise direction about the axis of pivot mounting 18 until the tilt table reaches a predetermined desired initial or starting position. At this time the piston rod will be moved downwardly and the lower end 24 thereof will operate limit switch LSi to de-energize the motor 34.

As previously indicated, the limit switch LS1 is fixedly mounted so that when operated the tilt table 12 occupies its predetermined or initial starting position. This position, also as previously indicated, may be that in which the axes of spindle means 16 and the pivot means 18 are in vertical alignment or it may be slightly displaced from this position. For example, the initial setup may be such that during tilting movement of the table 12 occasioned by wear of the hone during the honing of a succession of gears, the axis of the spindle means 16 will pass through the vertical plane occupied by the pivot mounting 18 at a time when the hone has undergone approximately half of the wear which is permitted between redressing operations.

In any case, after replacement of a hone or dressing of a hone, the machine is again placed in its initial setup position simply by initiating operation of the motor 34 which moves both the hone and the work to setup position. The hone remains in this position until redressing or replacement is required, but the tilt table moves counterclockwise as a multiplicity of work pieces are honed, due to the action of the piston and cylinder device 20 which maintains the hone and work in tight mesh under predetermined pressure conditions.

Reference is now made to FIGS. 2 and 3 which illustrate the structure associated with the lower end of the cylinder 20 from which the lower portion 24 of the piston rod extends. Secured to the lower end 24 of the piston rod is a cross-head 56. Fixedly secured to a mounting plate 58 is a limit switch LS1 having a plunger 60 actuated by a lever 62 pivoted as indicated at 64 to an arm 66 fixed to the support plate 58. An actuating pin 68 extends through a guide tube 70 in housing 72 carried by the mounting plate 58 and when the tilt table 12 reaches the predetermined starting position, the lower end 24 of the piston rod engages the pin 68 which rocks the lever 62 to actuate limit switch LS1, thus terminating operation of the motor 34.

MEASUREMENT OF HONE WEAR

The cross-head 56 which is fixedly secured to the lower end 24 of the piston rod includes a laterally extending arm 76 carrying an adjustable abutment screw 78 which in turn engages the lower end of an actuating pin 80. Carried by a bracket 82 fixedly mounted on the plate 58 is a dial indicator 84 having an actuating plunger 86 extending to the left as seen in FIG. 3. Pivoted to the bracket 82 as indicated at 88 is a dog 90 having a lower horizontal surface 92 engageable by the upper end of the pin 80 and a generally vertical surface 94 engageable by the end of the actuating plunger 86.

It will be observed that in the specific embodiment of the invention illustrated the line of the action of the plunger 86 is separated from the axis of the pivot mounting of the dog 90 a somewhat greater distance than separates the axis of the pivot mounting from the line of action of the pin 80. If these distances are properly selected in accordance with the distance between the line of action of the piston 22, 24 and the axis of the pivot mounting 18, which mounts the tilt table 12 to the frame 10, and the spacing of the axis of the spindle means 16 mounting the work gear W about the axis of pivot mounting 18, then the dial indicator 84 may read directly in terms of movement of the work gear W toward the hone H. Of course, if these distances do not bear the same relationship to each other, it may be necessary to convert the actual readings of the dial indicator into terms of displacement of the work gear, and to provide a dial on the indicator which reads in terms of gear displacement, rather than actual movement of the indicator plunger 86.

In operation of the machine and taking advantage of the indicator 84 for one of its intended purposes, the first of a succession of gears mounted on the machine and a hone in new or newly dressed condition is meshed with the work gear and the parts adjusted into the initial or starting position as previously described. At this time the dial indicator is zeroed and operation of the machine commenced. Normally, machines of this type include automatic loading and unloading mechanism so that the machine undergoes a succession of cycles in which individual work gears are loaded in the machine, honed, withdrawn from the machine, and the following gear automatically loaded into position. During this time, and particularly during the initial cycling of the machine, the operator will carefully observe the coaction between the hone and succession of work gears. During this time material is removed from the teeth of the hone and the honing operation of the succession of gears is accompanied by tilting motion of the table 12 from its initial position counterclockwise to maintain each of the succession of gears in tight mesh with the hone. Eventually, due to wear of the teeth of the hone, the crests of the hone teeth begin to bottom in the spaces between the teeth of the work gear. This condition, which may be termed an interference condition, is undesirable and calls for dressing the hone by removing a predetermined amount of material from its outside diameter, or replacing it with a new hone, if the hone is sufficiently worn.

The reading of the dial indicator when the crests of the teeth of the hone begin to bottom in the tooth spaces of the gear, indicates the range of acceptable movement of the tilt table from its predetermined and repeatedly reset starting position to the position at which hone dressing or replacement is required. During subsequent honing cycles between successive hone dressing or replacement steps, it will not be necessary for the operator to carefully observe the condition of the gear and hone, but only to pay attention to the reading on the indicator which indicates the amount which the tilt table has rocked during this particular succession of gears. When the indicator reading approaches that corresponding to the predetermined table position at which hone dressing or replacement is required, the operator can stop automatic cycling and redress or replace the hone.

SIGNAL RESPONSIVE TO HONE WEAR

The foregoing lends itself to a further improvement in automatic operation in which signal means such for example as a signal light (not shown) is provided on the machine which is adapted to be actuated when the tilt table has moved through its permissible range of movement and hence, calls for hone redressing or replacement. The signal light is connected to a limit switch LS2 which is adapted to be actuated by an adjustable abutment 96 carried on an arm of the cross-head 76. When the piston has moved upwardly so as to tilt the tilt table from its initial or starting position to the position calling for hone dressing or replacement, the abutment 96 may be adjusted so that in this position it trips the limit switch LS2 and lights the signal light. Accordingly, after the hone has been dressed or replaced and the hone slide advanced to reposition the tilt table in starting position, resulting in downward movement of the piston in cylinder 20, the abutment 96 will be spaced below the limit switch LS2 by the required amount so that when the tilt table, during the next succession of gear finishing operations, has worn material from the hone to a degree to require hone dressing or replacement, the abutment 96 will trip limit switch LS2 and light the signal light.

Obviously, instead of lighting the signal light, the switch LS2 may be suitably connected into the machine circuitry so as to terminate automatic machine operation until the hone has been dressed or replaced.

MEASUREMENT OF HONING PRESSURE

In gear honing machines a relatively small force acting directly between the gear hone and the work gear is desirable. For example, a honing force of between 20 and 30 pounds is typical. It is to be understood that this force is the overall force and no attempt is made to accurately determine the actual pressure between the inclined surfaces of the teeth.

Determining the amount of this force and controlling it accurately is rendered difficult due to the fact that the honing machine includes relatively heavy and massive components which require forces many times greater than the resultant honing force to effect movement. For example, in the present machine it is apparent that the honing force which determines the actual force applied horizontally between the hone H and the work gear W, is accomplished by lifting the table 12 or at least by rocking it about a pivot axis so that a substantial lifting force is required.

In order to clarify the terms used herein, the total lifting force applied by the piston and cylinder device 20 is referred to as the motive force. It will be understood that a large proportion of this force is required to overcome the weight and resistance to movement of the tilt table. Accordingly, the honing force which is the horizontal force applied directly to the hone by the work gear W is in general equal to the motive force less that portion thereof necessary to effect unopposed horizontal movement of the hone.

In order to determine this honing force, the machine is provided with a calibrated leaf spring 100 having a lower inclined portion as shown adapted to be engaged by a pin 102 carried by the dog 90. As illustrated, the pin 102 is spaced from the axis of the pivot connection 88 of the dog in a position to move clockwise upon upward movement of the piston and generally perpendicular to the lower inclined portion of the leaf spring. Conveniently, the leaf spring is formed by providing a slot 104 in a plate 106 which is pivoted on a pin 108. The plate 106, in the operating position best illustrated in FIG. 3, is retained against movement by a movable lug 110 held in position by a clamping screw 112.

With the parts in the relationship illustrated in FIG. 3, and with either the work gear or the hone, or both, removed from the machine, pressure is applied to the cylinder 20 in an amount sufficient to move the piston upwardly until the pin 102 just engages the spring 100. The spring is dimensioned such that at this time the shoulder 94 of the dog 90 will have engaged the plunger 86 of the indicator and the indicator needle will be displaced to an intermediate position. At this time the dial indicator is zeroed and the pressure of fluid within the cylinder 20 is increased to obtain a predetermined displacement of the indicator needle.

The spring 100 thus opposes an increasing resistance to upward movement of the piston and the spring will have been calibrated so that any reading obtained on the dial indicator corresponds to an excess of force applied by the piston and cylinder device 20 over that required to effect unopposed upward movement of the table and hence, unopposed movement of the work gear W toward the hone. Thus, the indicator reading may be converted directly into a honing force, taking into account of course the spring rate as well as the proportions of motion transmitting elements such for example as the lever arms of movement of the pin 102 and surfaces 92 and 94 of the dog, and the effective lever arms of the axis of the gear and the point of application of lifting force to the table with respect to the pivot mounting thereof. Having once established this relationship, dial indicator readings may be tabulated directly in terms of honing pressure measured in pounds. Accordingly, any particular desired honing pressure when observed may be co-related to the observed pressure existing in the piston and cylinder device 20 and of course, the desired honing pressure may thereafter be obtained by maintaining pressure of fluid within the cylinder 20 at the required value.

Of course, during the honing operation in which upward or tilting movement of the table is opposed only by engagement of the gear W and the hone H, the lug 110 is swung from the position best illustrated in Figure to permit free swinging movement of the spring plate 106.

As previously stated, certain features of the present invention are intended primarily for use in gear honing, in which the honing operation results in appreciable continuous wear of the honing tool. However, other features of the invention are applicable to gear shaving, gear rolling, gear burnishing, etc. Thus for example, the arrangement which permits determination of the actual operating forces acting directly between the tool and work piece have utility not limited to honing.

The dressing of the hone after its teeth have been worn down by honing a succession of gears, involves removal of material at the crests of the teeth. The profiles of the hone do not require dressing since these will be continually worn into a form conjugate to the profiles of the gear teeth. In FIG. 5 there is illustrated the method of dressing worn hones to remove material from the crests of the teeth and so to reduce the diameter of the hone. The gear, here indicated at 120, is mounted on a suitable support indicated at 122 and is driven in rotation by conventional means (not shown). The crests of the teeth are engaged by the flat surface 124 of an abrasive disc 126, all as more clearly illustrated and described in Daniel, et al. U.S. Pat. No. 3,077,877, issued Feb. 19, 1963. It is to be noted that this dressing operation has as its sole effect the removal of material at the crests of the teeth which would otherwise bottom in the tooth spaces in the gear, resulting in interference.

It is assumed herein that the work gears being honed are involute gears in which the tooth surfaces of the gear are involute in radial cross-section from a base circle of predetermined or known dimension. Gears of this type have the unique capability of operating with conjugate involute gears at different center distances while maintaining a true proportional velocity dependent on the size of the base circles. When honing individual gears the amount of stock removal from the sides or profiles of the gear teeth is minimal, the principal object being to remove nicks and burrs and to make only minor improvement in profile or other errors. However, during the honing of a multiplicity or a large number of gears, material is removed by erosion from the sides or profiles of the hone teeth. Accordingly, these teeth become thinner in cross-section and hence, when they are placed in tight mesh between teeth of successive gears, the center distance between the gears and hone decreases. Due to the ability of involute gears (and in this context the hone may be considered as a conjugate gear), to operate in a true conjugate fashion at different center distance, this reduction in center distance between the gear and hone does not prevent the hone from coacting properly with the involute profiles of successive gears. However, since material is not removed from the crests of the teeth of the hone, the condition of interference which has been referred to comes about when the crests of the hone teeth bottom in the spaces between gear teeth.

Accordingly, the novel method may be considered as a method of honing a multiplicity of work gears which comprises placing the first gear of a first series of gears in tight mesh with a gear-like hone in new condition so as to have a predetermined clearance between the crests of the hone teeth and the bottoms of the spaces between gear teeth and thus, establishing an initial position to be occupied by the first gears of successive series of gears. The hone and successive gears are rotated in tight mesh under pressure conditions to finish side profiles of the gear teeth while material is worn away from the sides of the hone teeth. The process is repeated with successive gears in the first series while reducing the center distance between the hone and successive gears to maintain tight mesh as material is removed from the sides of the hone teeth until the crests of the hone teeth approach an interference condition in which they would bottom in the spaces between gear teeth. This reduction in center distance is specifically the result of movement of successive gears toward the hone which is rotated in a fixed position. Accordingly, when one of the work gears reaches a position corresponding to approach to interference, this position is sensed and further honing operation on gears of the first series is terminated. At this time the hone is reconditioned by removing material from the crests of its teeth, or it may be replaced by a new hone, and this hone in new condition is then brought into tight mesh with the first gear of a second series of gears and the hone and gear, while maintained in tight mesh, are moved as a unit until the first gear of the second series of gears occupies the aforesaid initial position. Thereafter, the hone is rotated in a fixed position and the gears of the second series are finished as before with gradual movement of successive gears toward the hone as material is worn away from the hone teeth. When a gear of the second series occupies the position corresponding to approach to interference, this position is sensed and the honing operation on the second series of gears is terminated and the hone replaced or reconditioned as before.

What we claim as our invention is:

1. The method of honing a succession of gears on an automatically cycled and loaded machine which comprises a gear support and a hone support for carrying a gear and a gear-like hone for rotation in mesh, the machine comprising means mounting one of said supports for periodic adjustments toward and away from the other of said supports and means mounting the other of said supports for free movement toward and away from said one support, which comprises establishing an initial position for said other support in which a work gear and a hone in new condition are in tight mesh with predetermined clearance between the crests of hone teeth and the bottoms of spaces between gear teeth, providing a succession of work gears on said gear support, biasing said other support toward said one support to establish honing pressure between the gears and hone, and driving one of said supports in rotation, thereby honing said gears and as a consequence thereof continually removing material from the hone by wearing away of material from the sides of the hone teeth, providing additional movement of said other support toward said one support to maintain the hone in tight mesh with each of the succession of work gears, sensing the position of said other support, and terminating the honing operation when the said other support is moved by the biasing force as a result of hone wear to a position which corresponds to an amount of hone wear which requires replacement of the hone by one in new condition, thereafter providing a hone in new condition and meshing the hone in tight mesh with a work gear while positioning said other support in said initial position, thereby re-establishing a position for said one support which it will occupy during the honing of a second succession of work gears as determined by the precise size of the replacement hone, maintaining said one support in said re-established position while honing the second succession of work gears until movement of said other support during a honing operation causes said other support to reach a position requiring replacement of the honing tool with a new or reconditioned tool, and thereupon terminating the honing of said second succession of work gears.

2. The method of performing a predetermined honing operation on a plurality of series of like gears by rotating each gear in mesh under light pressure contact with a gear-like honing tool which comprises placing a hone on a rotatable hone support in mesh with the first gear of a first series on a rotatable gear support, biasing one of said supports toward the other to provide tight mesh between the gear and hone, positively advancing the other support toward said one support to thereby move said other support to a predetermined position selected as the position to be occupied by said one support upon initiation of the honing action on the first gear of each series, thereupon terminating advance of said other support and fixing it in the position which it then occupies for the honing of all gears of the first series, rotating the gear and hone in light pressure contact, successively replacing the honed gears with the following gears of the first series, removing material from the sides of the teeth of the hone during the honing of each gear and biasing said one support toward said other support during each honing operation to maintain successive gears of the first series in mesh in light pressure contact with the hone as its teeth wear as aforesaid, sensing the position of said one support as successive gears of the first series are honed, terminating finishing of successive gears when said one support reaches a predetermined position during a honing operation at which interference between the teeth of gear and hone is imminent, thus determining the end of the first series of gears, replacing the worn hone on the hone support with a hone in new condition as regards tooth thickness and tooth height, placing a gear which is to be the first gear of a second series on the gear support, biasing said one support toward the other support to thereby maintain the gear and hone in tight mesh, advancing said other support to thereby move said one support to the aforesaid predetermined position selected as the position to be occupied by the said one support upon limitation of the honing action on the first gear of each series, thereupon terminating advance of said other support and fixing it in the position which it then occupies for the honing of all gears of the second series, and thereafter successively honing all gears of the second series by rotation in mesh in light pressure contact with the hone until said one support again reaches the predetermined position at which tooth interference is imminent.

3. The method as defined in claim 2 which comprises mounting the work gears on said one support, and mounting said hone on said other support.

4. The method as defined in claim 3 which comprises moving said other support away from said one support and away from the fixed position which it occupied during the sequence of honing operations on the gears of said first series prior to replacing the hone on the hone support.

5. The method as defined in claim 2 which comprises reconditioning the hone used on the first series of gears by removing material from the crests of its teeth.

* * * * *